(12) United States Patent
Luchsinger

(10) Patent No.: US 10,457,186 B2
(45) Date of Patent: Oct. 29, 2019

(54) PNEUMATIC PLATFORM TOW TRUCK WITH HINGE

(71) Applicant: SWISSMEX-RAPID, S.A. de C.V., Lagos de Moreno (MX)

(72) Inventor: Pedro Wirz Luchsinger, Lagos de Moreno (MX)

( * ) Notice: Subject to any disclaimer, the term of this patent is extended or adjusted under 35 U.S.C. 154(b) by 0 days.

(21) Appl. No.: 14/877,801

(22) Filed: Oct. 7, 2015

(65) Prior Publication Data

US 2016/0221487 A1   Aug. 4, 2016

(30) Foreign Application Priority Data

Oct. 7, 2014 (MX) .................... MX/a/2014/012080

(51) Int. Cl.
*B60P 1/43* (2006.01)
*B60P 3/12* (2006.01)
*B60P 3/07* (2006.01)

(52) U.S. Cl.
CPC ............. *B60P 1/431* (2013.01); *B60P 3/07* (2013.01); *B60P 3/122* (2013.01)

(58) Field of Classification Search
CPC .. B60P 1/431; B60P 3/122; B60P 3/07; B60P 1/16; B60P 1/43; B66F 3/35
USPC ....... 414/471, 476, 480, 491, 494, 537, 538, 414/563
See application file for complete search history.

(56) References Cited

U.S. PATENT DOCUMENTS

| 1,414,835 | A | * | 5/1922 | Spohrer | ............... B60S 9/10 254/93 R |
| 2,705,081 | A | * | 3/1955 | Jacobs | ............... B60P 1/43 193/41 |
| 2,838,191 | A | * | 6/1958 | Schramm | ............... B60G 5/053 414/476 |

(Continued)

FOREIGN PATENT DOCUMENTS

DE     8913158 U1     12/1989
DE     19712316 A1 * 10/1998 ............ B60P 1/431

(Continued)

OTHER PUBLICATIONS

PCT International Search Report dated Jan. 21, 2016 in related PCT Application No. PCT/IB2015/057674.

(Continued)

*Primary Examiner* — James Keenan
(74) *Attorney, Agent, or Firm* — Robert D. Buyan; Stout, Uxa & Buyan, LLP

(57) ABSTRACT

A truck having a tiltable platform or other cargo bed and its methods of use. In some embodiments, the rear suspension of the truck may be lowerable to lower the platform or bed while it undergoes tilting. In other embodiments the rear suspension need not be lowerable and the platform or bed may remain at constant height before, during and after tilting. An integrated hinge and inflatable air bags may be used to move the platform or bed between a horizontal position and a tilted position. One or more loading ramps are deployable to facilitate loading of different types of cargo or vehicles. The platform or bed may be equipped with holes in which pulleys for multiple angles can be placed. Shrouded air bags may be used to prevent unwanted movement or rattling of ramps or other structures.

15 Claims, 15 Drawing Sheets

(56) References Cited

U.S. PATENT DOCUMENTS

| | | | |
|---|---|---|---|
| 3,584,754 A | 6/1971 | Moll | |
| 4,153,227 A * | 5/1979 | Gamaunt | F16F 15/0232 |
| | | | 248/575 |
| 4,198,187 A * | 4/1980 | Mountz | B60P 1/431 |
| | | | 14/71.1 |
| 4,318,657 A * | 3/1982 | Znidaric | B60P 3/07 |
| | | | 298/14 |
| 4,572,579 A * | 2/1986 | Saito | B60P 1/16 |
| | | | 254/93 HP |
| 4,968,210 A * | 11/1990 | Friederich | B60P 3/07 |
| | | | 280/402 |
| 5,067,774 A * | 11/1991 | Trowland | B60P 1/16 |
| | | | 254/93 HP |
| 5,121,900 A * | 6/1992 | McDonald | B66F 3/35 |
| | | | 254/2 R |
| 5,253,410 A * | 10/1993 | Mortenson | B60P 1/431 |
| | | | 14/71.1 |
| 5,326,215 A | 7/1994 | Eberhart | |
| 5,462,249 A * | 10/1995 | Calzone | B60P 1/43 |
| | | | 14/71.1 |
| 5,560,684 A | 10/1996 | Gilmore | |
| 5,887,880 A | 3/1999 | Mullican et al. | |
| 5,984,614 A * | 11/1999 | Weber | B60P 3/125 |
| | | | 280/402 |
| 6,254,192 B1 * | 7/2001 | Spreitzer | B60P 1/16 |
| | | | 298/19 R |
| 6,267,448 B1 | 7/2001 | Hendry et al. | |
| 6,443,685 B1 * | 9/2002 | Maeno | B60P 3/12 |
| | | | 280/402 |
| 6,802,095 B1 * | 10/2004 | Whitmarsh | B60P 1/431 |
| | | | 14/69.5 |
| 7,077,616 B2 * | 7/2006 | Wagner | B60P 1/431 |
| | | | 414/537 |
| 7,309,202 B1 * | 12/2007 | Anderson | B60P 1/431 |
| | | | 108/44 |
| 7,503,742 B2 | 3/2009 | Smith | |
| 2006/0284393 A1 | 12/2006 | Smith et al. | |

FOREIGN PATENT DOCUMENTS

| | | | | |
|---|---|---|---|---|
| EP | 0846592 A1 * | 6/1998 | | B60P 1/431 |
| EP | 0870706 A1 | 10/1998 | | |
| GB | 2145041 A * | 3/1985 | | B60P 1/16 |
| GB | 2168323 A * | 6/1986 | | B60P 1/16 |
| GB | 2355247 A * | 4/2001 | | B60P 1/16 |
| GB | 2496989 A | 5/2013 | | |
| NL | 2006643 C | 10/2012 | | |
| WO | WO 2007/014143 A2 * | 2/2007 | | B60P 1/431 |

OTHER PUBLICATIONS

Extended European Search Report dated Jun. 6, 2018 in related European Application No. 15848709.0.

* cited by examiner

PNEUMATIC PLATFORM TOW TRUCK WITH HINGE

RELATED APPLICATION

This patent application claims priority to Mexican National Patent Application No. MX/a/2014/012080 filed Oct. 7, 2014, the entire disclosure of which is expressly incorporated herein by reference.

BACKGROUND

In the current state of the art, boom tow trucks and especially hydraulic tilting platform tow trucks are well known in the loading transportation area, and especially in the vehicle transportation area. Platform tow trucks are typically based on a truck with a 5 to 15 ton capacity called cab chassis, with suspension in the back part with traditional springs. In it, the chassis is elongated in order to increase the distance between the front and the back axis, thus getting a greater length for the loading platform. On this modified chassis, a structure is mounted—such structure comprises tracks, a hinge and a support system to the floor called leg. On such structure a sliding platform is mounted. Such platform may be completely flat or it may be slightly modified at the back bottom in order to get adapted to the floor—such modification is commonly called ducktail.

In order to place the platform tow truck in the loading position, the platform is tilted between 18 and 20 degrees and it then slides downwards until it touches the floor. The platform practically runs over 56% of its length and therefore it needs a lot of maneuvering space. Besides, due to its length, it is exposed between the floor and the first supported point, which is the hinge. The structure requires a support leg so that the platform will not bend and the truck does not get elevated, leaving its front tires up in the air. This traditional system also has another inconvenient: it only works with hydraulic media and the loading angle is too high in relationship with the surface, therefore low profile vehicles or those with a "long front" hit the platform when being loaded, thus risking being broken. In the case of the vehicles that cannot move due to their braking down or because they have been crashed, they are loaded using a winch, which makes a great deal of effort because it has to load the vehicle onto a tilted platform.

SUMMARY OF THE INVENTION

The present invention generally provides cargo trucks, including but not limited to flatbed trucks, wherein inflatable members such as air bags are operable to cause a cargo bed of the truck to move back and forth between a non-tilted (e.g., horizontal) position and a tilted position. In some embodiments, the truck may (optionally) have lowerable rear suspension which allows the cargo bed to lower in addition to tilting. In some embodiments, the trucks may be equipped with one or more deployable loading ramps to facilitate loading of different types of cargo or vehicles onto the cargo bed. In some embodiments, the trucks may be equipped with pulley mounting locations for attachment of pullies to assist loading of cargo onto the cargo bed, such as for pulling cargo from a lateral location (e.g., a vehicle that is positioned off to the side of a roadway) to a position closer to the truck.

Still further aspects, elements, uses and objects of the invention will be apparent to those of skill in the relevant art upon reading the following detailed descriptions of examples and reference to the accompanying drawings.

DETAILED DESCRIPTION OF EXAMPLES

The following detailed description and the accompanying drawings to which it refers are intended to describe some, but not necessarily all, examples or embodiments of the invention. The described embodiments are to be considered in all respects only as illustrative and not restrictive. The contents of this detailed description and the accompanying drawings do not limit the scope of the invention in any way.

The present invention overcomes certain disadvantages of platform tow trucks of the prior art by provided a truck chassis which includes, for example, pneumatic suspension in the back, a hinged stretcher and a tilting platform with a pneumatic system, assisted by access ramps in the back and side holes for the positioning of pulleys of multiple angles that allow to manipulate the load more easily from different angles, thus resulting in a more efficient tow truck and that needs a lower access angle than those currently known in the market.

Figure 1:
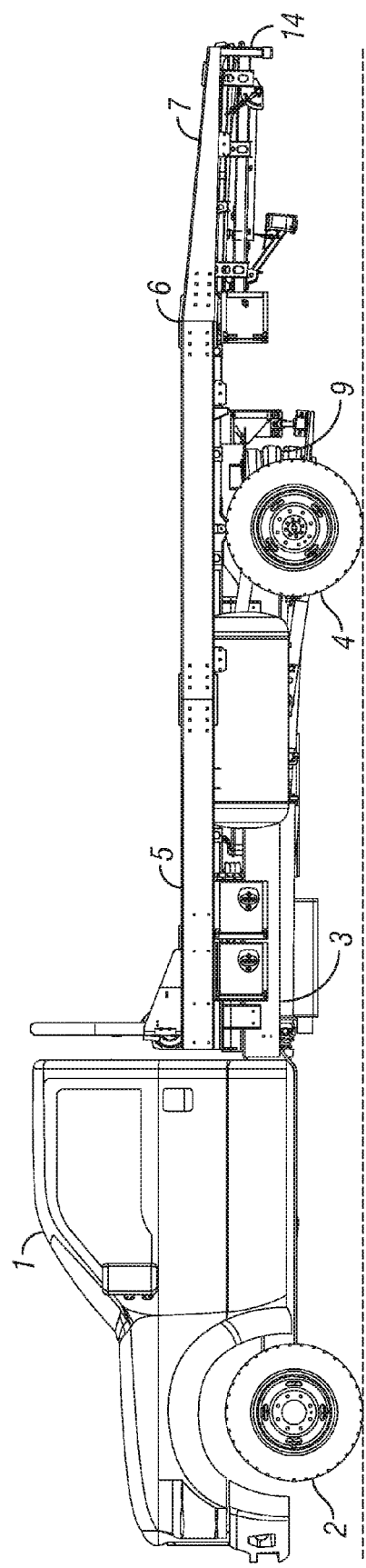
FIG. 1 shows a side view of a preferred realization form of this invention, showing its main components.
Figure 2:
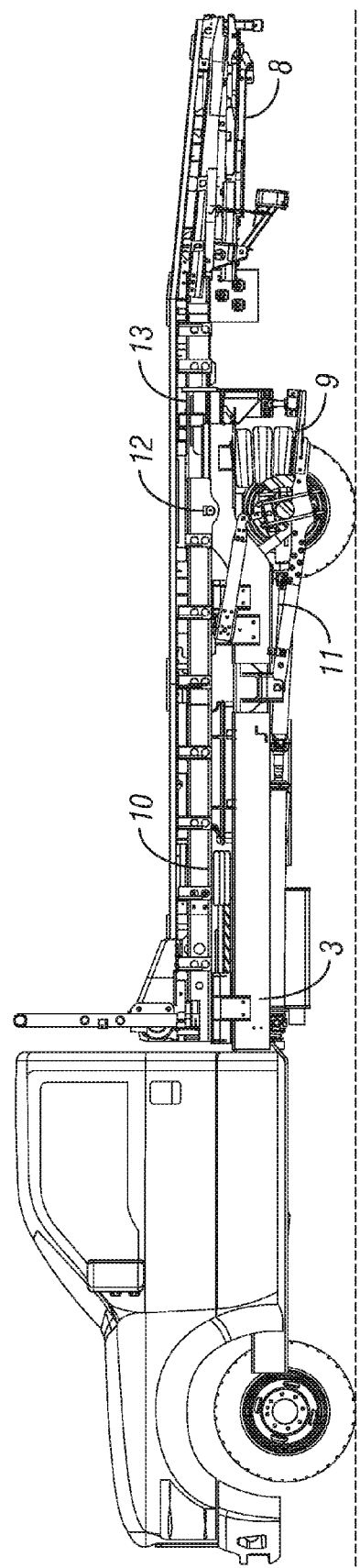
FIG. 2 is a section view of FIG. 1, showing the rest of the components.

With reference to the drawings, specifically FIG. 1, the platform tow truck of this invention is comprised of the cabin of the truck (1), the front axis with tires (2), the chassis of the truck (3), the back axis with tires (4), the main platform (5), the breaking point or the tilting point (6) of the platform, in which the flat part bends downwards to a certain angle and the back part (7) is slightly tilted. FIG. 2 is a section view in which other components are shown, such as one or more ramps (8) which are extendable from the rear end of the tilted part of the platform, the two air bags (e.g., airsprings) of the back suspension (9), the two front air bags (e.g., airsprings) (10) for the tilting of the platform to a loading position, the "S" type stretcher (11) placed in the last part of the chassis, the tilting hinge on the stretcher (12) and the back air bag (13) to take the platform back to its transporting position.

Figure 3:
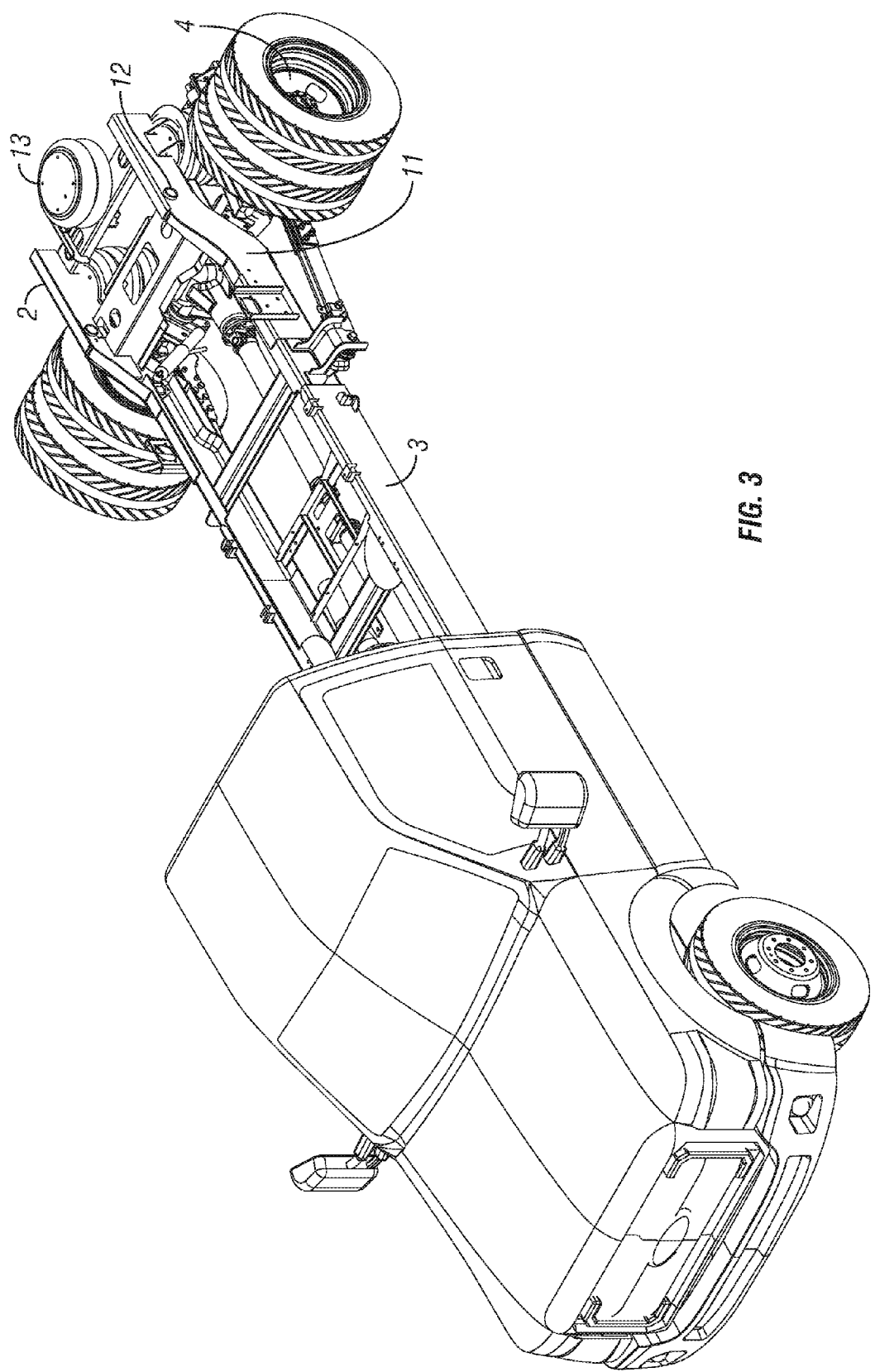
FIG. 3 is an isometric view that shows a detail of the "S" type stretcher that goes located in the back part of the truck chassis and that contains the hinge strategically positioned for the tilting function. Behind the hinge, on the "S" type hinge, the back central bag can be seen. Its function is to take the platform to its original position.

Back to the non-limiting example of FIG. 1, in this invention the chassis (3) of the truck gets extended thus increasing the distance between the front axis (2) and the back one (4) in order to get a greater length for the loading platform (5). The suspension system of the back axis (4)—of metallic springs—is substituted by an air suspension system, by placing two air bags (e.g., airsprings) (9), one for each spring, thus getting a much more friendly suspension. In addition to this (refer to FIG. 3), an "S" shaped stretcher (11) is installed on the back part, on the two tracks or frames of the chassis (3). In the stretcher's back end, a hinge (12) is adjusted. Such hinge allows tilting the platform. Said stretcher (11) is designed in such a way that the hinge (12) is strategically placed at a cautious distance from the back axis (4) and at a height such that, when the platform (5) (refer to FIG. 1) gets lowered when the bags (e.g., airsprings) of the back suspension are deflated (9), the adequate tilting angle of the platform (5) is obtained. Its descending movement is limited by means of internal blocks in the bags (e.g., airsprings), or external blocks on the structure (not shown in the images). It is through this design that it is achieved that the platform (5) never collides with any component of the equipment, nor that it rests on the upper side of the wheels or back tires.

Figure 4:
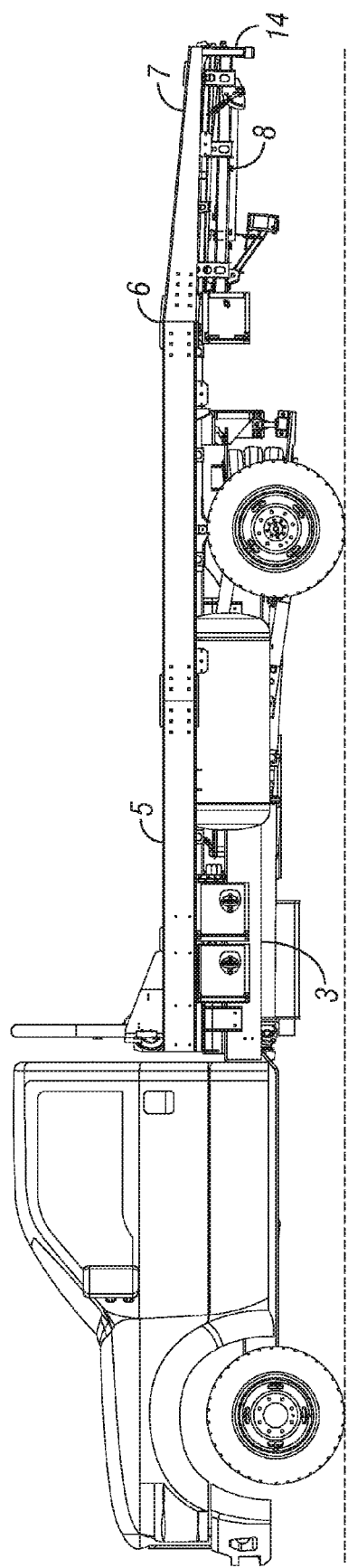
FIG. 4 shows the truck in horizontal position, as it would move on the road, with or without a load. In said figure we can observe as well that the main platform has a tilted section in its back part.
Figure 5:
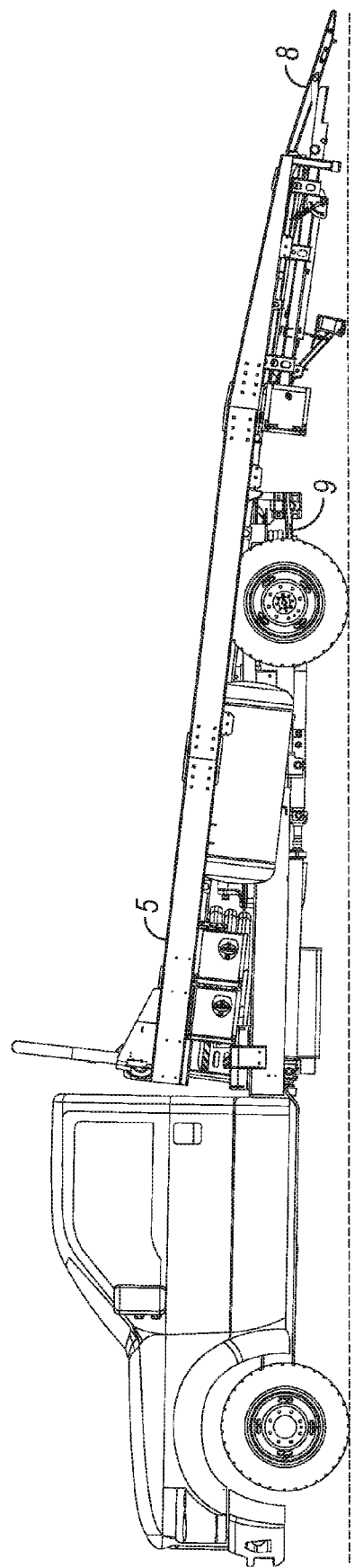
FIG. 5 shows the truck with the back suspension deflated, the platform tilted and the ramps already extended.

The Platform (5) is mounted on all of the chassis (3). It has a special design (refer to FIG. 4) meaning that it is not completely flat, but that at two thirds of the distance from the cabin (1) it is bent downwards in 5-10° in order to bring it closer to the floor at the back. In one preferred form of realization of this invention, a system of telescopic ramps (8) is placed on the bent section of the platform (7), as well as two legs (14) at the left and right back edges that will get the weight in that section when the platform (5) is in loading position (refer to FIG. 5).

Figure 6:
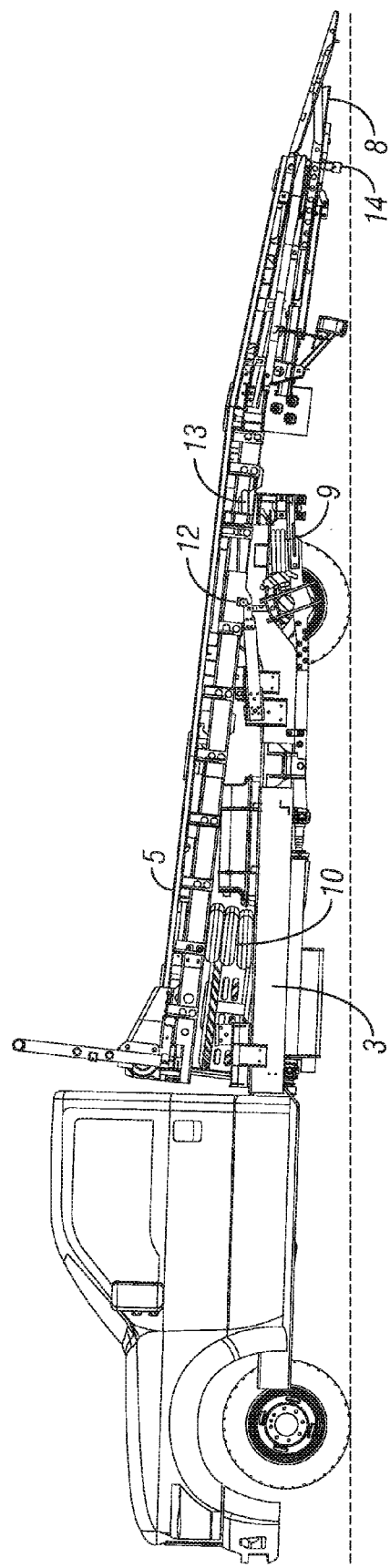
FIG. 6 shows a closer look of the two front bags (e.g., airsprings), one on a side, that, when inflated, tilt the platform in order to take it to the loading position (only one bag (e.g., airspring) can be observed).

Back to FIG. 6, in order to position the tow truck in a position to load, meaning having the platform low and tilted, first of all the air is let out of the two bags (e.g., airsprings) (9) of the back suspension and by doing so the platform (5) lowers its position until it gets to the lowest height of the internal blocks of the bags (e.g., airsprings) or the external blocks on the structure, and in parallel the tilting of the platform (5) is initiated, thus lifting its front part, moving away from the chassis (3) by means of the inflation of the two front pneumatic bags (e.g., airsprings) (10) installed between the chassis (3) of the truck and the platform (5), at an approximate distance of 75% between the hinge (12) and the back part of the truck's cabin (1). By inflating the two front bags (e.g., airsprings) (10), the platform (5) is tilted to the loading position. The pressurized air filling is strong enough to lift the platform (5) and to achieve the adequate tilting angle with or without load in parallel, the bag (e.g., airspring) (13) deflates.

Figure 7:
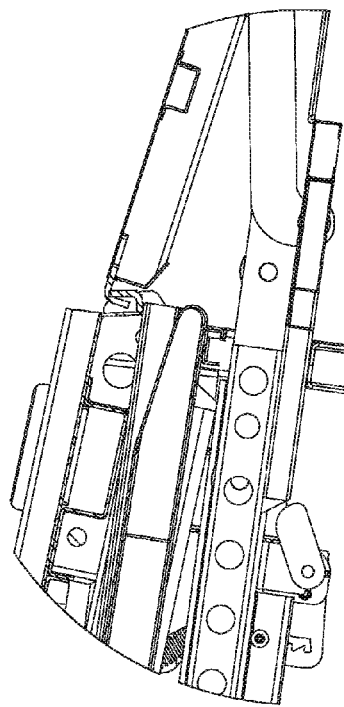
FIG. 7 shows the back supporting legs of the platform in detail (only one of them is shown).
Figure 8:
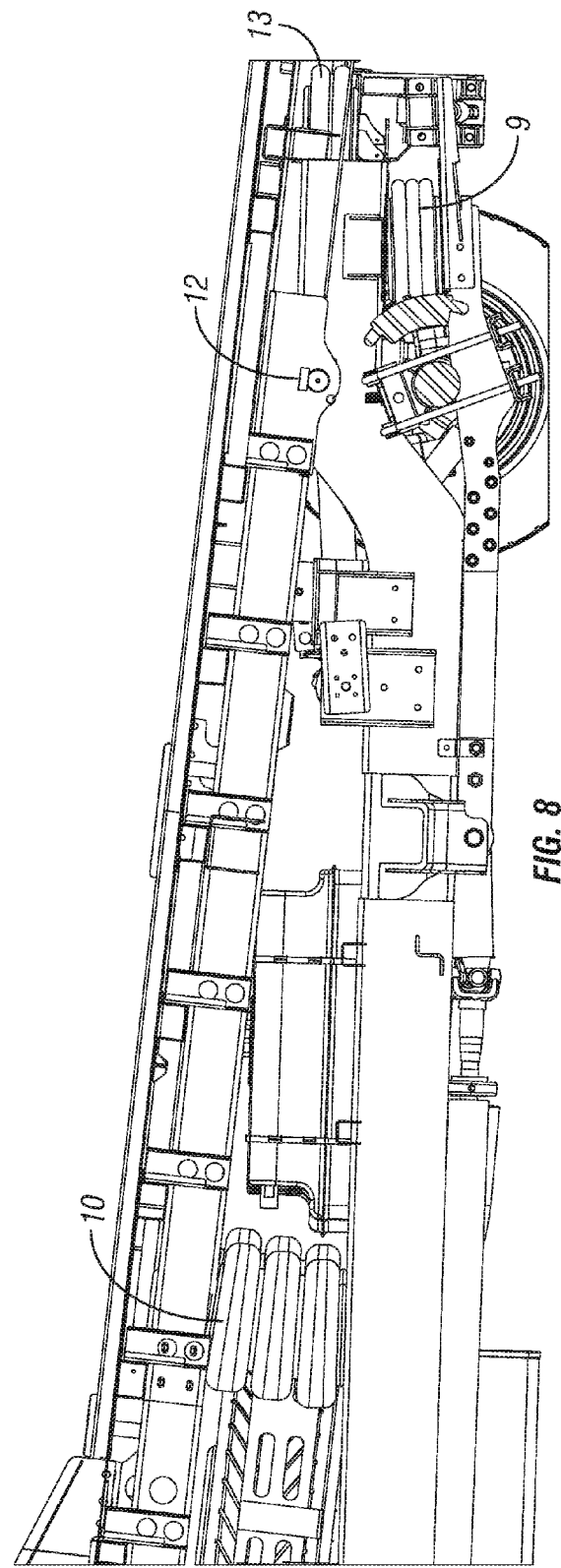
FIG. 8 shows the "S" type stretcher ensemble in detail, with the hinge and the platform in loading position with its two front bags (e.g., airsprings) inflated and the back bag (e.g., airspring) deflated.

The ramp (8) is manually taken out of the back part of the platform (5) or it could as well be taken out in an assisted manner, by using a pneumatic cylinder before tilting it, and then the platform (5) is tilted until the back legs (14) touch the floor. (see FIG. 7) The ramp (8) is placed in such a way that it touches the floor in its back part. By doing this the total tilting needed to load a vehicle is achieved, whether the vehicle is moving on its own or being pulled by winch, of 12°. So that the platform (5) goes back to the horizontal transportation position, besides inflating the bags (e.g., airsprings) (9) of the back suspension to take the platform to the natural height, the weight of the platform itself (5) the weight of the load of itself and of its accessories allows pressing and deflating the two front pneumatic bags (e.g., airsprings) (10). At the same time, in a strategic manner a third central back bag (e.g., airspring) inflates (13) it is installed behind the hinge (12), practically at the final end of the chassis (3) over the "S" type stretcher (11), whose job is to push the platform (5) to its original transportation position. (See FIG. 8)

There is no limitation for the platform's movement to be performed exclusively with air bags (e.g., airsprings). It can also take place with hydraulic cylinders, but since the suspension system works with air and is equipped with a compressor system and a regulation tank, tilting the platform can be accomplished by using the same technology of compressed air and expandable rubber bag (e.g., airspring) with air (pneumatic spring or air bag (e.g., airspring)).

Figure 9:
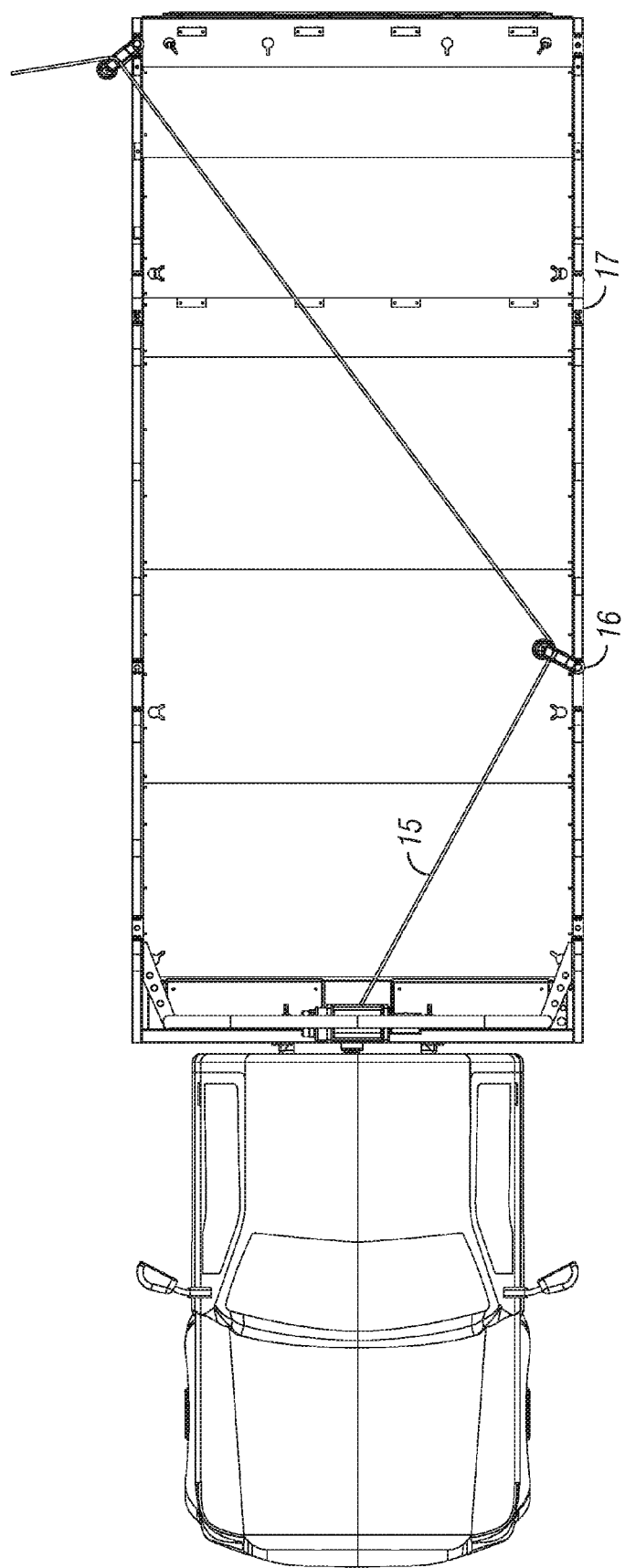
FIG. 9 shows the truck with its platform and four side drill holes at the same distance on each side, and two pulleys for multiple angles, through which the winch cable goes.

Referring to FIG. 9, the platform (5) also has four drill holes (17) along its external sides (four on each side), at equal distances. There, the pulley of multiple angles (16) can be placed, to pass the winch's cable (15) through there. Like this, there are up to eight placing positions available at the pulleys with multiple angles in order to get an infinite number of traction angles to be chosen from, depending on the traction angle required according to the direction of the broken vehicle regarding the tow truck's position.

The system has a mechanical block at the front (not shown). Once the platform (5) is in a horizontal position, it is blocked so that the platform (5) does not accidentally tilt.

Using this truck with the described characteristics is not only limited to the operations of a tow truck, since it can be used in order to efficiently transport industrial machinery; by adding an enclosure, it can be used to load and to transport animals, different sorts of goods, agricultural products . . . etcetera, and by mounting a closed box on it, it can be useful to transport medications, packed foodstuff, household appliances, etc.

Figure 10:
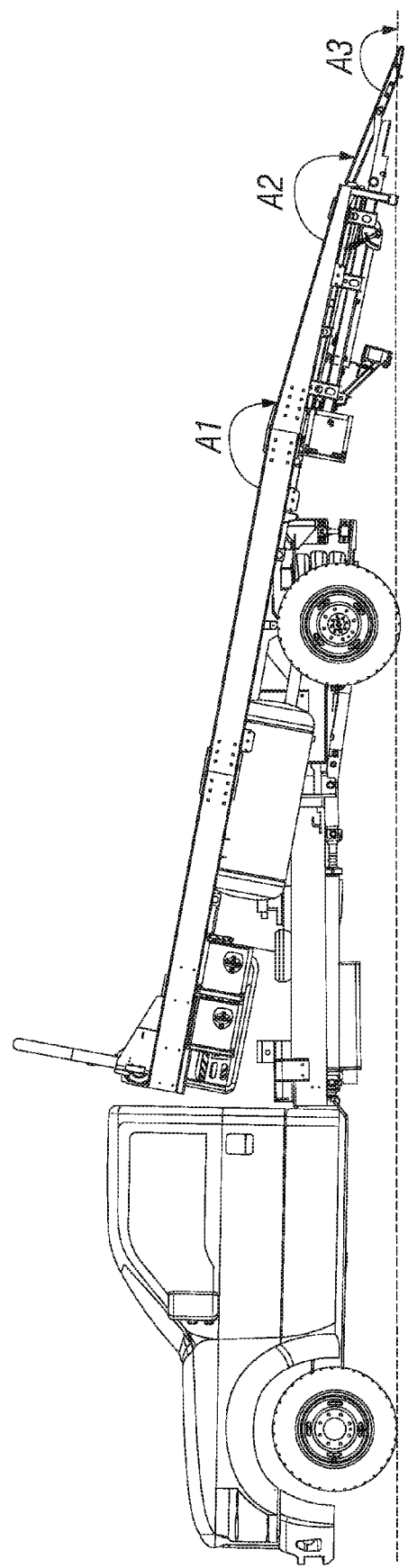
FIG. 10 shows an embodiment of a truck of the present invention wherein the truck's suspension does not necessarily deflate and may utilize traditional non-adjustable springs. In this example, the overall height of the truck's platform remains constant and the platform tilts so that its rear end becomes lower, its front end becomes higher and its angle of operation becomes steeper.

Another variation of this invention is gotten if it is not desired to deflate the back suspension bags (e.g., airsprings) (9) or if the original spring system is left, therefore the height of the chassis (3) never changes and only the function of tilting all of the platform (5) around the hinge (12) is used, thus getting a similar result, with the difference that the loading angle will be 160 instead of 12°. This is shown in FIG. 10.

Figure 11:
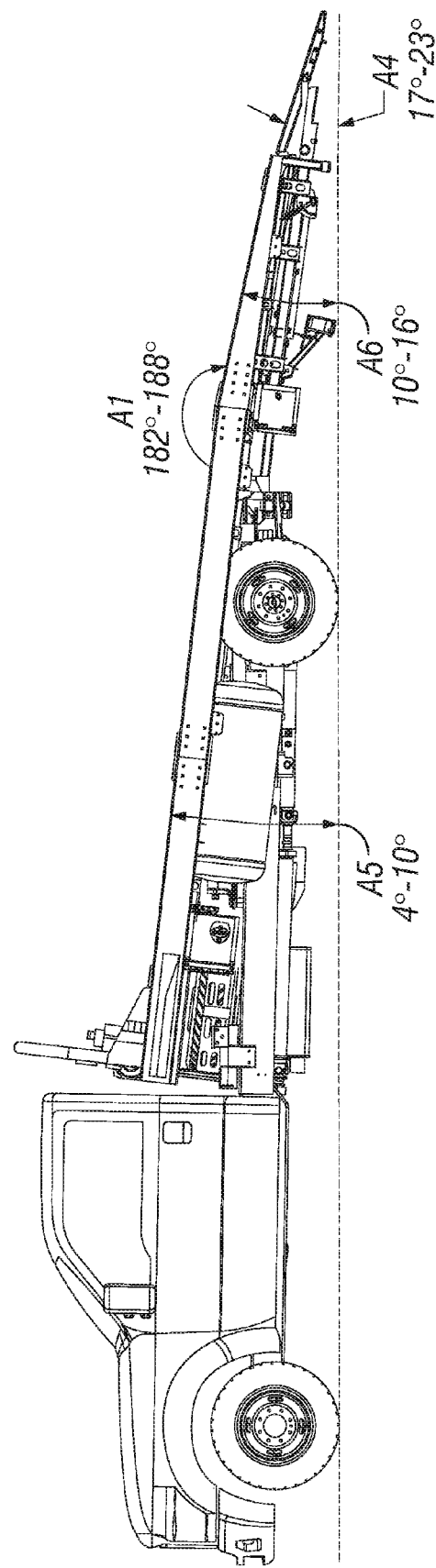
FIG. 11 shows an embodiment of a truck of the present invention wherein the rear suspension lowers, the platform tilts and a first loading ramp is deployed from the rear end of the platform.
Figure 12:
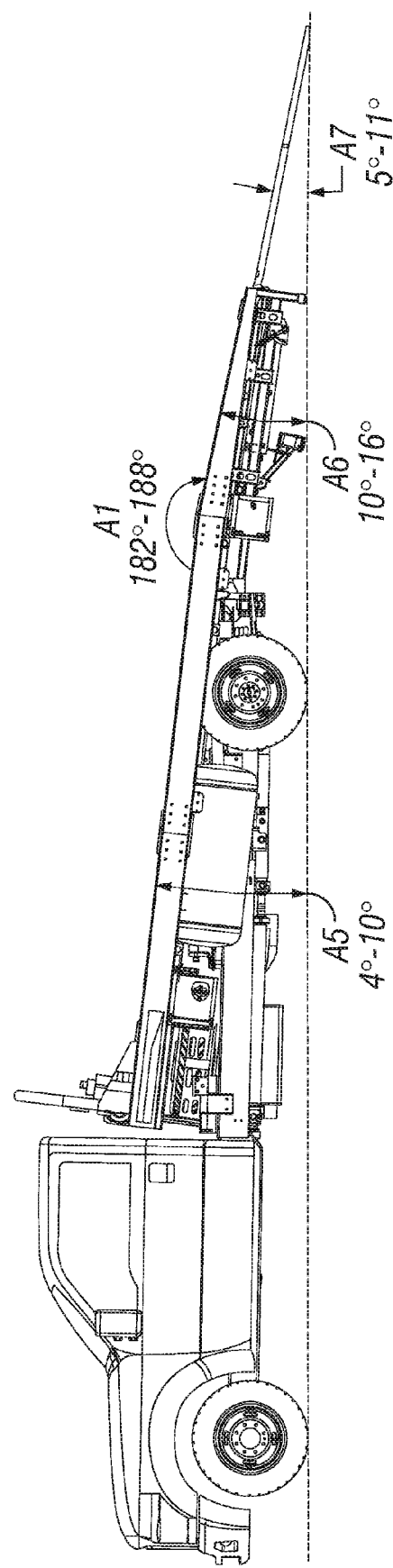
FIG. 12 shows the tow truck of FIG. 11 with alternative second loading ramps deployed from the rear end of the platform.
Figure 13:
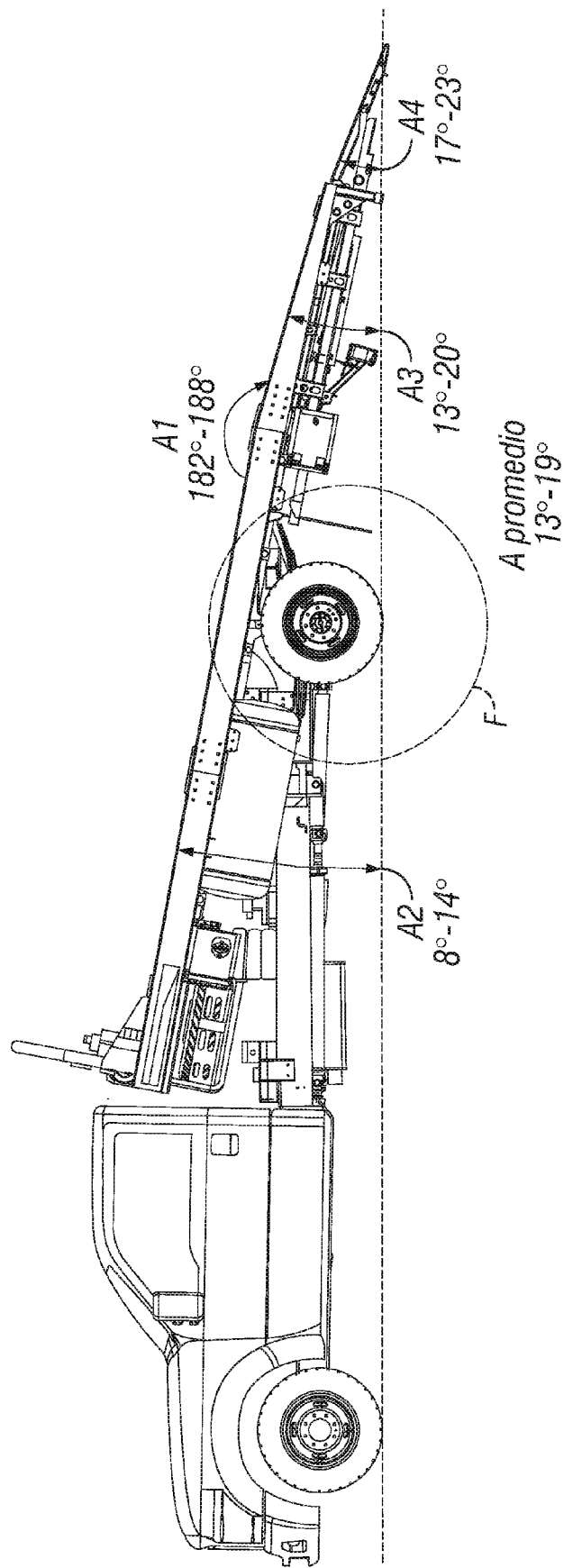
FIG. 13 shows an embodiment of a truck of the present invention wherein the rear suspension does not lower, the platform tilts and a first loading ramp is deployed from the rear end of the platform. It is to be appreciated that the second loading ramps shown in FIG. 12 may alternatively be used in the non-lowerable truck of FIG. 13 just as they are in the lowerable truck seen in the example of FIG. 12.
Figure 13A:
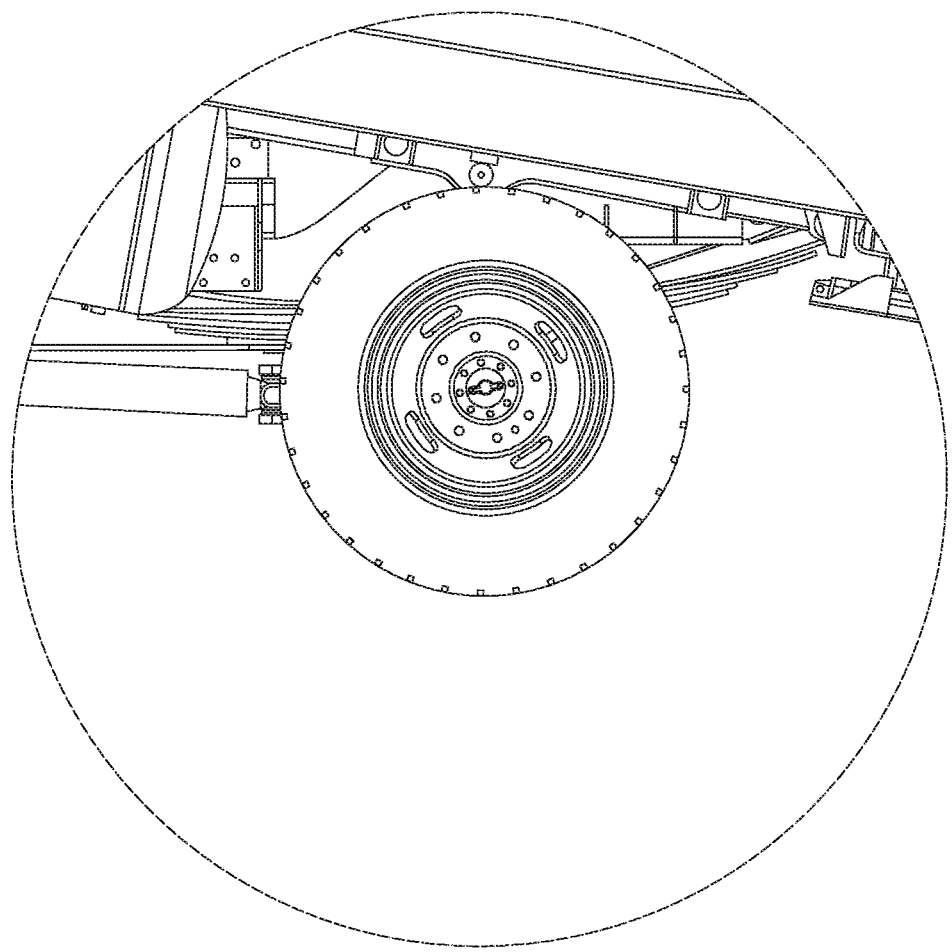
FIG. 13A is an enlarged view of the indicated region of FIG. 13.

FIGS. 11 through 13 show examples of alternative embodiments of trucks of the present invention. Specifically, FIGS. 11 and 12 shows a truck of the present invention wherein the rear suspension lowers and the platform tilts. FIG. 13 shows an alternative truck wherein the rear suspension does not lower as its platform tilts.

FIGS. 11 and 12 also show alternative types of rear loading ramps that may be included separately or in combination on any of the trucks of the present invention. In the example of FIG. 11, a first (shorter) loading ramp (8) is deployed providing an angle (A4) of from about 17 degrees to about 23 degrees between the top surface of that first rear ramp (8) and the adjacent, level ground surface. In FIG. 12, a set of second (longer) rear ramp(s) (24R, 24L) are deployed providing an angle (A7) of from about 5 degrees to about 11 degrees between the top surface of that first rear ramp (8) and the adjacent level ground surface.

Details regarding the structure, function, stowing/deployment and operation of the alternative types of rear loading ramps 8 and/or 24R/24L are shown in FIGS. 14 through 17A are described in more detail below.

Figure 14:
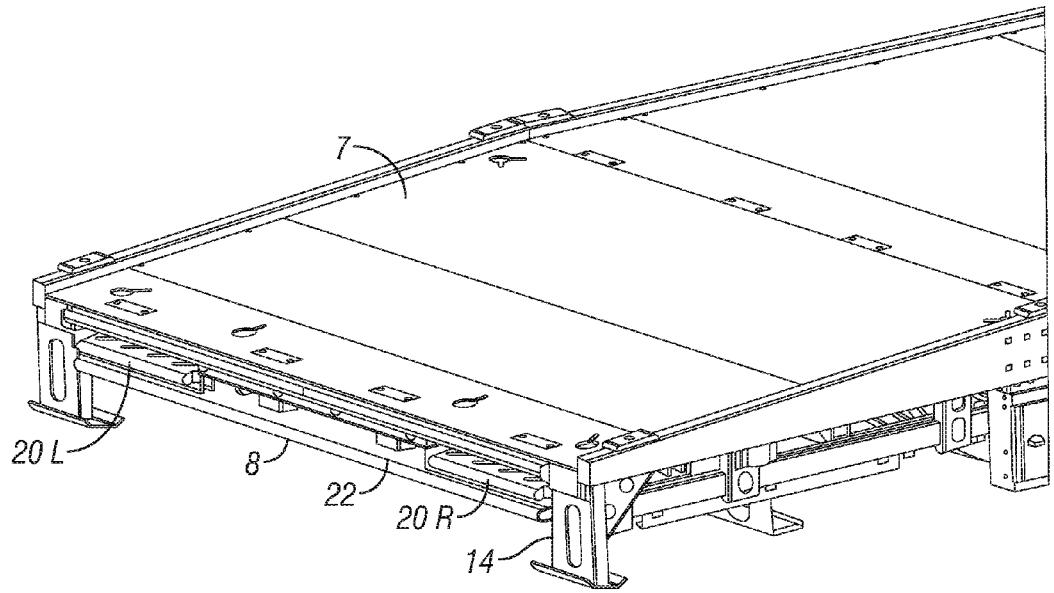
FIG. 14 shows the rear portion of a truck of the present invention equipped with both a first (shorter) loading ramp (8) and second (longer) loading ramps (24R, 24L).
Figure 15:
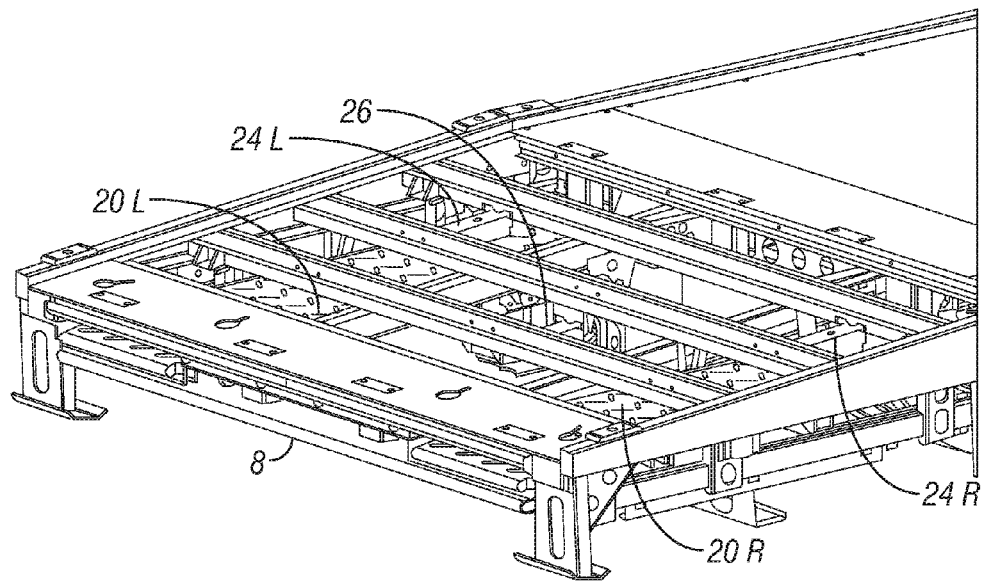
FIG. 15 is a view of FIG. 14 with the upper platform removed exposing the underlying components including the first (shorter) loading ramp (8) and second (longer) loading ramps (24R, 24L) in stowed (non-deployed) positions.
Figure 16A:
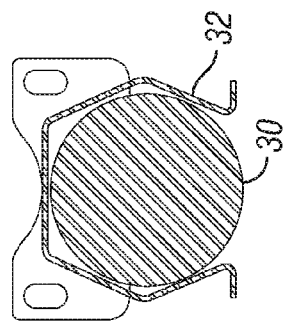
FIG. 16A is a cross sectional view through Line A-A of FIG. 16.

It is to be appreciated that some trucks of the present invention may include a plurality of loading ramps which are alternately deployable from the rear end (22) of the platform (7) of the cargo bed. These alternately deployable loading ramps may be sized and/or configured to so that they provide different incline angles (i.e., differing steepness of incline) or other variations in ramp configuration, thereby enabling the truck to be selectively adapted for loading of differing types of cargo (e.g., vehicles having differing ground clearance heights or differing length of protrusion ahead of their front axles). For example, as shown in FIGS. 14 and 15, the truck may have a first (short) loading ramp (8) and second (long) loading ramps (20R and 20L) which are moveable back and forth between stowed positions wherein they are located under or within a rear portion of the platform (7) and deployed positions wherein they extend from the rear end (22) of the platform (7) min the manner shown in FIGS. 11 and 12 described above.

In the example shown, the first loading ramp (8) comprises a single (i.e., one piece) ramp which spans all or a substantial portion of the width of the rear end of the cargo bed (7) and the second loading ramps (20R and 20L) comprise right (20R) and left (20L) ramp members which are deployable in side-by-side positions from the rear end of the cargo bed. However, any of the loading ramps may be constructed in any suitable way comprising any suitable number of members or portions. Indeed, for example, the first loading ramp (8) could alternatively be formed as a plurality (e.g., side-by-side right and left) ramp members and the second loading ramps (20R, 20L) could alternatively be formed as a single ramp member.

Also, movement of the loading ramp(s) between their stowed and deployed positions mat be power driven or manual. In the example shown the first loading ramp (8) is connected to a piston, such as an air piston (not shown), which moves the first loading ramp (8) back and forth between its stowed position (FIG. 14) and its deployed position (FIG. 11). However, it is to be understood that the first loading ramp (8) could alternatively be moveable by hand or by any other suitable apparatus for causing such movement. Also in the example shown, the second loading ramps (20R, 20L) are manually moveable between their stowed positions (FIG. 14) and their deployed positions (FIG. 13). However, it is to be understood that the second loading ramps (20R, 20L) could alternatively be power driven by piston(s) or any other suitable apparatus for causing such movement.

As noted above, when the shorter first loading ramp (8) is deployed from the tilted platform (7) it provides a steeper angle of incline than when the longer second loading ramps (20R and 20L) are deployed. Specifically, in the non-limiting example shown, the first loading ramp (8) forms an incline of about 17 degrees to about 23 degrees when deployed and the second loading ramps (20R and 20L) form an incline of about 5 degrees to about 11 degrees when deployed. Thus, the first loading ramp (8) with its relatively steep incline angle may be suitable for loading vehicles that have relatively high ground clearance and/or relatively short nose portions extending ahead of their front axles without causing the vehicle to bottom out or impact the loading ramp (8). On the other hand, it may be necessary to use the longer second loading ramps (20R and 20L) with their relatively shallow incline angles to prevent bottoming out or impacting of the ramp when loading a vehicles that have relatively low ground clearance or lengthy nose portions that extending forward of their front axles.

In at least some embodiments of the invention, the loading ramp(s) may be secured in a manner that deters rattling or unintended movement of the loading ramp(s) from their stowed positions. FIGS. 14 through 17A show non-limiting examples of how such securement of the loading ramp(s) may be accomplished through the use of holding devices which frictionally engage the loading ramp(s) to deter their rattling or unintended movement from their stowed positions. In this example, each holding device comprises a, inflatable member such as a shrouded air bag (24R, 24L or 26). These shrouded air bags (24R and 24L) are mounted in the structure of the platform (7) so as to engage and hold the right and left second ramps (20R and 20L) while in their stowed positions. A third shrouded air bag (26) is mounted in the structure of the platform (7) so as to engage and hold the first loading ramp (8) while in its stowed position.

Figure 17A:
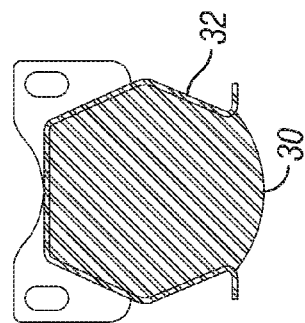
FIG. 17A is a cross sectional view through Line A-A of FIG. 17.
Figure 16:
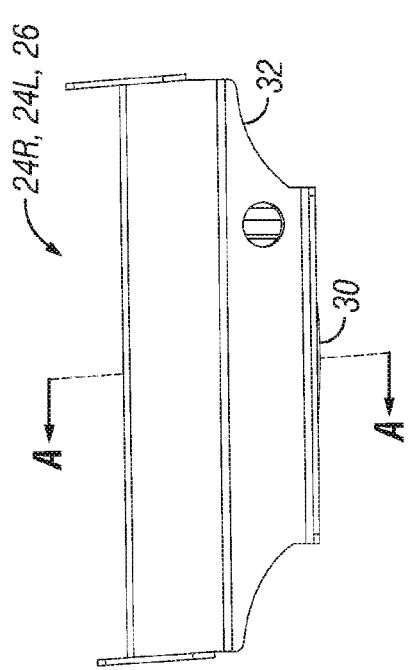
FIG. 16 is a side view of a partially shrouded air bag assembly with its air bag in a deflated state.
Figure 17:
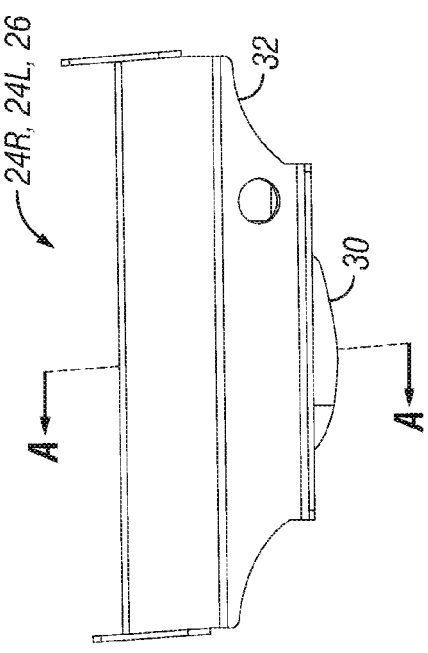
FIG. 17 is a side view of a partially shrouded air bag assembly with its air bag in an inflated state.

As seen in FIGS. 16 through 17A, each shrouded air bag (24R, 24L or 26) comprises an inflatable bladder 30 and a rigid shroud 32 which extends partially around the inflatable bladder such that, when inflated, the inflatable bladder protrudes in a direction away from the rigid shroud. In operation, when the air bladder 30 is deflated, the adjacent loading ramp (8, 20R or 20L) is free to move between its stowed position and its deployed position. When the air bladder 30 is inflated with the adjacent loading ramp (8, 20R or 20L) in its stowed position, the air bladder 30 will expand and protrude in the direction where the shroud 32 is absent (i.e., away from the shroud) and the air bladder 30 will thereby exert pressure against the adjacent loading ramp (8, 20R or 20L), thus deterring that loading ramp (8, 20R or 20L) from rattling or moving from its stowed position while the truck is in transit. Subsequently, when it is desired to deploy the adjacent loading ramp (8, 20R or 20L), the air bladder 30 is deflated so that it no longer presses against the adjacent loading ramp (8, 20R or 20L) and that loading ramp is then free to move from its stowed position to its deployed position and back again.

In further accordance with the present invention, there is provided a process or method for loading a vehicle or other cargo on a cargo bed, such as a platform, of a truck of the present invention. For example, after the truck has been maneuvered to a desired position near the vehicle or cargo, the following steps may be performed:

1. Release the air of the ramp air springs (they become loose).
2. Push out the central ramp with the pneumatic piston (unstow).
3. Click on the ramp to the rim of the truck by hand.
4. Release the air of the main suspension and the truck will lower to the lowest position in order to sit onto the back axle.
5. Tilt the platform, releasing the air of the back air spring and fill the air springs in front until the legs touch the floor and stop.
6. Load car or other cargo onto the truck's platform and fasten car or cargo suitably for transport.
7. Tilt the platform, filling the air of the back air spring and release the air springs in front until the platform is back on its original position on the chassis.
8. Fill the air of the main suspension and the truck will raise to the horizontal position.
9. Unclick on the ramp from the rim of the truck by hand.
10. Stow the central ramp with the pneumatic piston (the piston will pull the ramp back into its initial position below the platform).
11. Fill the air of the ramp air springs (they become tight.

It is to be appreciated that, although the invention has been described hereabove with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion unless otherwise noted. For example, in at least some embodiments of the invention, the cargo bed of the truck may move back and forth between the tilted and non-tilted position without longitudinal movement, longitudinal repositioning or longitudinal shifting of the cargo bed relative to the rear wheels of the truck. All reasonable additions, deletions, modifications and alterations are to be considered equivalents of the described examples and embodiments and are to be included within the scope of the following claims.

What is claimed is:

1. A cargo truck comprising:
    a chassis,
    front axle with front wheels attached thereto;
    rear axle with rear wheels attached thereto;
    a cab mounted on a front portion of the chassis;
    a cargo bed mounted on a rear portion of the chassis, said cargo bed comprising a platform having a front portion which is rigidly connected to a rear portion such that an upper surface of the rear portion extends downwardly at a fixed angle relative to an upper surface of the front portion, said fixed angle remaining constant irrespective of whether the cargo bed in a tilted position or a non-tilted position;
    at least one inflatable member positioned under the front portion of the cargo bed, said inflatable member being inflatable to an inflated configuration that causes the entire platform to move to the tilted position and thereafter deflatable to a deflated position which allows the cargo bed to assume the non-tilted position;
    first and second loading ramps which are stowable in stowed positions in or below a rear portion of the cargo bed and alternately extendable from said stowed positions to deployed positions wherein they extend to the ground When the cargo bed is in the tilted position, said first and second loading ramps differing in length such that the first and second loading ramps, when extended to their deployed positions, have different angles of incline from the ground to the rear portion of the cargo bed; and
    at least one additional inflatable member which, when inflated, is configured to exert pressure on the first and second loading ramps when in their stowed positions so as to deter rattling or unintended movement of the loading ramps while the truck is in transit.

2. A cargo truck according to claim 1 wherein the upper surface of the rear portion extends at a fixed downward angle (A1) of from about 182 degrees to about 188 degrees relative to the upper surface of the front portion.

3. A cargo truck according to claim 1 wherein, the first loading ramp forms an incline of about 17 degrees to about 23 degrees when it is deployed and the second loading ramp forms an incline of about 5 degrees to about 11 degrees when it is deployed.

4. A cargo truck according to claim 1 wherein said at least one inflatable member comprises at least one shrouded air bag.

5. A cargo truck according to claim 4 wherein said at least one shrouded air bag comprises an inflatable bladder and a rigid shroud which extends partially around the inflatable bladder such that, when inflated, the inflatable bladder protrudes in a direction away from the rigid shroud.

6. A cargo truck according to claim 1 wherein said at least one additional inflatable member comprises at least one shrouded air bag.

7. A cargo truck according to claim 6 wherein said at least one shrouded air bag comprises an inflatable bladder and a rigid shroud which extends partially around the inflatable bladder such that, when inflated, the inflatable bladder protrudes in a direction away from the rigid shroud.

8. A cargo truck according, to claim 1 wherein said at least one additional inflatable member comprises a first additional inflatable member configured to exert pressure on the first loading ramp when in its stowed position so as to deter rattling or unintended movement of the first loading ramp while the truck is in transit and a second additional inflatable member configured to exert pressure on the second loading ramp when in its stowed position so as to deter rattling or unintended movement of the second loading ramp while the truck is in transit.

9. A cargo truck according to claim 1 wherein the first loading ramp comprises a single ramp which spans all or a substantial portion of the width of the rear end of the cargo bed and the second loading ramp comprises right and left ramps which are deployable in side-by-side positions from the rear end of the cargo bed.

10. A cargo truck according to claim 1 further comprising a pull line connected to a winch useable to assist loading of cargo onto the cargo bed.

11. A cargo truck according to claim 10 wherein the pull line and winch are useable for pulling cargo onto or into the cargo bed while the cargo bed is in the tilted position.

12. A cargo truck according to claim 11 further comprising pulley mounting fixtures at desired locations on the cargo bed and pulleys that are mounter or mountable to the pulley mounting locations to cause the pull line to pull at lateral angles relative to the cargo bed.

13. A cargo truck according to claim 1 wherein said at least one inflatable member comprises at least one fore inflatable member located forward of the rear axle and wherein the cargo truck further comprises at least one aft inflatable member located rearward of the rear axle, wherein said at least one aft inflatable member is configured to be deflated concurrently with inflation of said at least one fore inflatable member, thereby causing the cargo bed to move from its non-tilted position to its tilted position.

14. A method for transporting a motor vehicle or other cargo using a cargo truck according to claim 1, said method comprising the steps of:
   providing a cargo truck according to claim 1;
   inflating said at least one inflatable member to thereby cause the entire cargo bed to move to the tilted position;
   moving the motor vehicle or other cargo onto or into the cargo bed;
   moving the cargo bed from the tilted position to the non-tilted position; and
   using the truck to transport the motor vehicle or other cargo.

15. A method according to claim 14 further comprising the steps of:
   deflating said at least one additional inflatable member; and
   moving at least one of said first and second loading ramps from its stowed position to its deployed position.

* * * * *